US012141272B2

(12) United States Patent
Saliba et al.

(10) Patent No.: US 12,141,272 B2
(45) Date of Patent: Nov. 12, 2024

(54) SYSTEMS AND METHODS FOR CLOUD-BASED COLLECTION AND PROCESSING OF DIGITAL FORENSIC EVIDENCE

(71) Applicant: Magnet Forensics Inc., Waterloo (CA)

(72) Inventors: Jad John Saliba, Waterloo (CA); Randy Shawn MacCarthy, Waterloo (CA); Tayfun Uzun, Waterloo (CA)

(73) Assignee: Magnet Forensics Inc., Waterloo (CA)

( * ) Notice: Subject to any disclaimer, the term of this patent is extended or adjusted under 35 U.S.C. 154(b) by 55 days.

(21) Appl. No.: 17/396,134

(22) Filed: Aug. 6, 2021

(65) Prior Publication Data

US 2022/0043907 A1  Feb. 10, 2022

Related U.S. Application Data

(60) Provisional application No. 63/063,702, filed on Aug. 10, 2020.

(51) Int. Cl.
*G06F 21/55* (2013.01)
*G06F 21/56* (2013.01)

(52) U.S. Cl.
CPC .......... *G06F 21/552* (2013.01); *G06F 21/566* (2013.01); *G06F 2221/034* (2013.01)

(58) Field of Classification Search
CPC . G06F 21/552; G06F 21/566; G06F 2221/034
See application file for complete search history.

(56) References Cited

U.S. PATENT DOCUMENTS

| | | | |
|---|---|---|---|
| 2004/0181513 A1* | 9/2004 | Henderson | G06Q 10/10 |
| 2005/0276442 A1* | 12/2005 | Alasia | H04L 9/32 |
| | | | 382/100 |
| 2016/0080397 A1* | 3/2016 | Bacastow | H04L 63/1433 |
| | | | 726/1 |

(Continued)

FOREIGN PATENT DOCUMENTS

WO  2019125854 A1  6/2019

OTHER PUBLICATIONS

Hong Guo • Bo Jin • Ting Shang; Forensic investigations in Cloud environments; 2012 International Conference on Computer Science and Information Processing (CSIP) (2012, Page(s): 248-251); (Year: 2012).*

(Continued)

*Primary Examiner* — Luu T Pham
*Assistant Examiner* — Chao Wang
(74) *Attorney, Agent, or Firm* — Own Innovation; Kent C. Howe; James W. Hinton

(57) ABSTRACT

Systems and methods for conducting a cloud-based forensic investigation of electronically-stored information are provided. The system includes an investigation requestor device configured to request a forensic investigation including selecting search criteria for the investigation, at least one remote system of the target, wherein the at least one remote system comprises electronically-stored information; a cloud server for storing forensic artifacts collected from the at least one remote system, wherein the forensic artifacts are collected based on the search criteria; and a cloud-based evidence-processing service configured to analyze the forensic artifacts and generate an initial report.

16 Claims, 10 Drawing Sheets

(56) References Cited

U.S. PATENT DOCUMENTS

| | | | |
|---|---|---|---|
| 2016/0226895 A1* | 8/2016 | Huang | G06F 21/552 |
| 2017/0244750 A1 | 8/2017 | Kinder et al. | |
| 2018/0018465 A1* | 1/2018 | Carey | G06F 21/50 |
| 2019/0044966 A1 | 2/2019 | Vega et al. | |
| 2019/0207772 A1* | 7/2019 | Hecht | H04L 63/10 |
| 2019/0207966 A1* | 7/2019 | Vashisht | G06F 21/564 |
| 2019/0236102 A1* | 8/2019 | Wade | G06F 40/205 |

OTHER PUBLICATIONS

Meera G • BKSP Kumar Raju Alluri • Digambar Powar • Geethakumari G; A strategy for enabling forensic investigation in cloud IaaS; 2015 IEEE International Conference on Electrical, Computer and Communication Technologies (ICECCT) (2015, Page(s): 1-5); (Year: 2015).*

Filipo Sharevski; Digital forensic investigation in cloud computing environment: Impact on privacy; 2013 8th International Workshop on Systematic Approaches to Digital Forensics Engineering (SADFE) (2013, Page(s): 1-6); (Year: 2013).*

European Patent Office, Extended European Search Report for European Patent Application No. 21020397, May 1, 2022.

* cited by examiner

SYSTEMS AND METHODS FOR CLOUD-BASED COLLECTION AND PROCESSING OF DIGITAL FORENSIC EVIDENCE

TECHNICAL FIELD

The embodiments disclosed herein relate generally to digital forensics, and, in particular to systems and methods for acquiring targeted data that is stored and processed by a forensic cloud service for the purposes of digital forensics.

BACKGROUND

With the advent of computer technology and the Internet, many people spend large amounts of time using computers for many different reasons. For example, users may use computers in the course of employment, to access social networks, communicate with other people using email or chat applications, conduct online shopping, process digital photography, research information, and so on.

For various reasons, a user may engage in behaviours that necessitate a forensic investigation of the electronically-stored information on their device or other storage location, for example a cloud service. In some situations, the user may attempt to hide, delete, or obfuscate some of this information so that it will not be readily accessible to someone else. In other situations, the user may have unknowingly engaged in a dangerous behaviour, such as by allowing a virus or malware to be downloaded onto their device.

In these cases, it may be desirable for another party to know how a particular computer has been used by a given individual (or in some cases a group of individuals). For example, an employer may be interested to learn about the activities undertaken by an employee on one or more company computing devices, such as a laptop or smartphone. This may be particularly true in the case of a departing employee. Often, the investigating party will solicit the help of a third-party forensic investigator to investigate the digital activity of the individual(s) of interest.

Digital forensic investigations are currently most often carried out on a third-party investigator device which has collected data from a target device. This often entails the third-party investigator being on-site or at least on-network. This approach can limit the scope of an investigation by restricting the geographic location of the investigator, reducing the breadth of data which can be processed, and increasing the time it takes for the investigation to initiated and completed. This is inefficient for both the investigating party, who may have to pay more for more hours of work as well as waiting longer to get answers, and for the third party investigator who could do more work in less time if the work was remote.

Currently, services which provide quick forensic investigations or searches of electronically-stored information do not provide usable results to the party requiring the investigation. That is, the party either does not have the tools to access the information in the format provided or the party does not have the knowledge required to interpret the data as provided.

Accordingly, there is a need in the art for efficient digital forensic investigation processes that can be performed "in cloud" as well as analysed and interpreted quickly, correctly, and accessibly to overcome the disadvantages of existing systems and methods.

SUMMARY

A system for conducting a cloud-based forensic investigation of electronically-stored information is provided. The system includes an investigation requestor device configured to request a forensic investigation including selecting search criteria for the investigation; at least one remote system of the target, wherein the at least one remote system comprises electronically-stored information; a cloud server for storing forensic artifacts collected from the at least one remote system, wherein the forensic artifacts are collected based on the search criteria; and a cloud-based evidence-processing service configured to analyze the forensic artifacts and generate an initial report.

The at least one remote system may be a target endpoint device.

In the system, a deployable agent comprising an executable program embedded with the search criteria may be deployed to the target endpoint device to search for the forensic artifacts.

The deployable agent may automatically delete from the target endpoint system.

The at least one remote system may be a cloud service.

The client device may log in to a website to request the forensic investigation and to select the search criteria.

The client device may use software to request the forensic investigation and to select the search criteria.

The cloud-based evidence-processing service may automatically analyze the forensic artifacts upon collection of the forensic artifacts from the remote system.

The forensic artifacts may be flagged by the cloud-based evidence-processing service within the first report.

The system of claim 1 wherein the first report is generated automatically by the cloud-based evidence-processing service and sent to the forensic service provider.

The forensic service provider may review the initial report and generate a final report which is sent to the client.

A method of conducting a cloud-based forensic investigation of electronically-stored information is also provided. The method includes: receiving at a cloud server search criteria for forensic artifacts within electronically-stored information of a remote system of a target from an investigation requestor device; scanning the remote system for the forensic artifacts using the search criteria; collecting the forensic artifacts from the remote system, wherein the forensic artifacts are collected to a cloud server; processing the forensic artifacts using a cloud-based evidence processing service; and generating a digital report based on the processed forensic artifacts.

The method includes receiving search criteria for forensic artifacts within electronically-stored information of a remote system of a target from a client device; scanning the remote system for the forensic artifacts, wherein the forensic artifacts are based on the search criteria; collecting the forensic artifacts from the remote system, wherein the forensic artifacts are collected to at least one cloud server of a forensic service provider; processing the forensic artifacts by a cloud-based evidence-processing service of the forensic service provider; and generating an initial report based on the processed forensic artifacts.

The forensic artifacts may be collected in real-time.

The search criteria may be selected by the client.

The client may log into a forensic service provider website to select the search criteria.

Selecting search criteria by a client may further include selecting search criteria from pre-determined options provided by the forensic service provider.

The remote system may be an endpoint device.

The search criteria may be embedded in a deployable agent and scanning the endpoint device may further include deploying the deployable agent to the endpoint device and scanning the endpoint device by the deployable agent.

The deployable agent may autodelete from the endpoint device.

The endpoint device may be connected to a client network.

The endpoint device may not be connected to a client network.

The remote system may be at least one cloud service.

The client may provide access to the at least one cloud service.

The forensic artifacts may be collected from the at least one cloud service by a collection service.

The initial report may be generated automatically.

The initial report may be an html report.

At least one artifact of interest may be flagged for review.

A final report may be generated and sent to the client.

The final report may be a pdf report.

A system for conducting a cloud-based forensic investigation of electronically-stored information is also provided. The system includes a target device storing electronically-stored information and a cloud server. The cloud server is configured to: receive search criteria from an investigation requestor device, the investigation requestor device being a client device or a forensic provider device; configure an evidence collection module using the received search criteria; initiate evidence collection from the target device using the configured evidence collection module; store a forensic artifact collected by the configured evidence collection module; analyze the forensic artifact using an evidence processing module; and generate a digital report from an output of the evidence processing module.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification.

DETAILED DESCRIPTION

Figure 1:
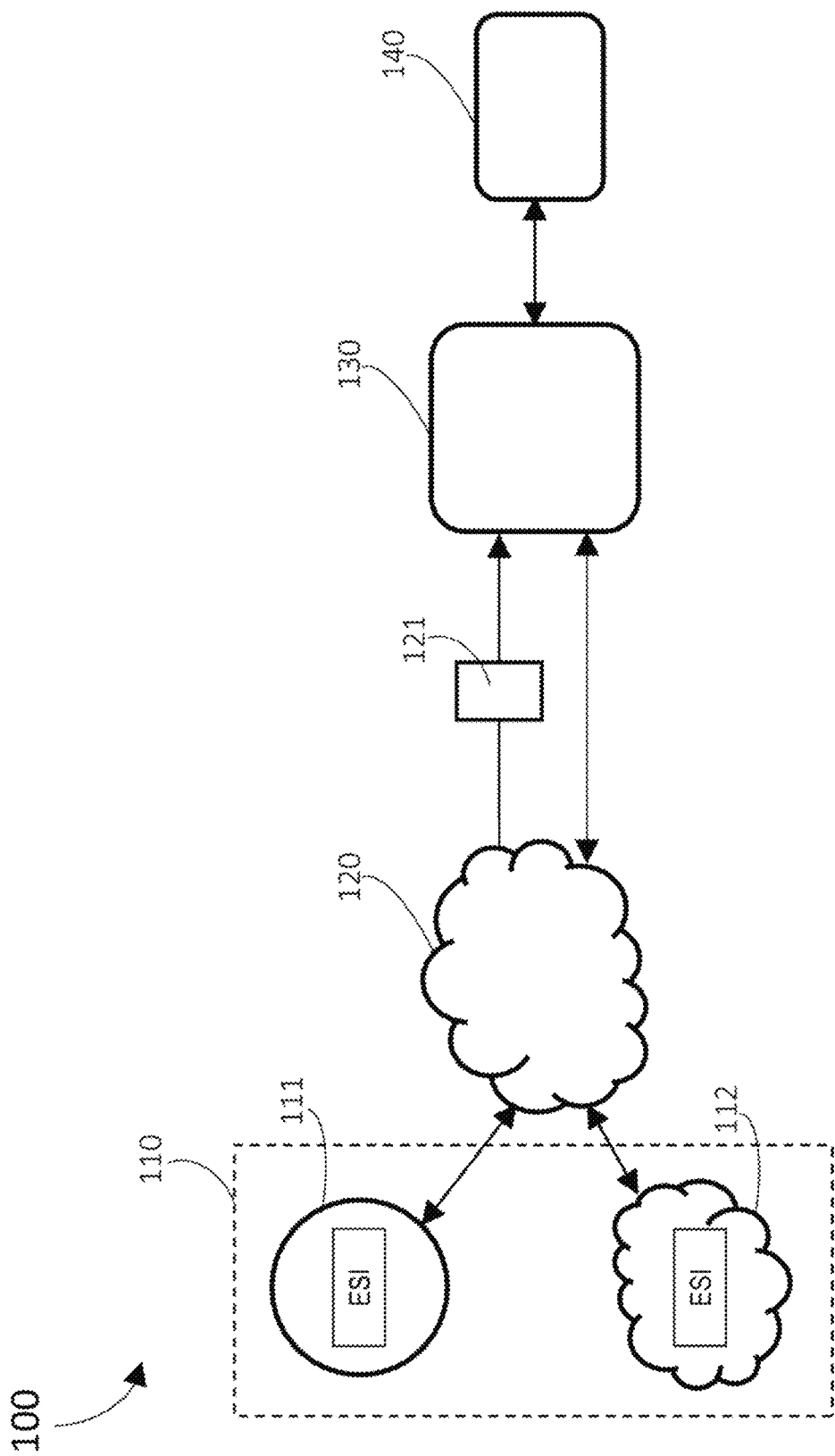
FIG. 1 is a schematic diagram of a system for cloud-based forensic investigation of electronically-stored information, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Current digital forensic investigations are performed on a third-party investigator (forensic service provider) device that has access to data from a target device. This approach has several disadvantages as discussed above. The present disclosure provides systems and methods for carrying out digital forensic investigations remotely and efficiently.

The present systems and methods are particularly suited to investigations which take place in a corporate setting, for example, in situations such as suspected IP theft, human resources disputes, fraud, virus or malware acquisition, etc.

Such investigations typically target current or departing employees. Forensic firms, law firms, and e-discovery firms may also find the present systems and methods useful. The systems and methods of the present disclosure may be used by any of these entities to perform an early case assessment (ECA). The ECA can then be used to estimate risk and decide if litigation should be pursued or other action should be taken, such as further investigation. This early case assessment can beneficially be provided in a "software as a service" model as discussed herein.

The present systems and methods may also be useful in criminal investigations.

For clarity, "client" refers to the person or entity who is request a forensic investigation be performed, e.g. the company or person from a company who is requesting an investigation, and "client device" refers to the computing device which the client uses to request the investigation.

The client, using the client device, requests the forensic investigation for a specific "target" or targets (e.g. person, people, or devices/cloud services of interest).

The "forensic service provider" is the entity which completes the forensic investigation of the target upon request from the client and which, in some embodiments, provides the software which the client uses to request the investigation. The "forensic service provider device" refers to at least one computing device used by the forensic service provider to communicate with the client and to perform the investigation. In some embodiments, the forensic service provider may be multiple forensic service providers or investigators working together.

Referring now to FIG. 1, illustrated therein is a system 100 for cloud-based forensic investigation of electronically-stored information, according to an embodiment. System 100 includes target electronically-stored information ("target ESI") 110 on a remote system, a cloud server 120 which implements a cloud-based evidence-processing service 120, a forensic service provider device 130, and a client device 140. The remote system does not have a wired connection to the forensic service provider device 130 or the client device 140.

The target ESI 110 may include ESI on a target endpoint device 111 and/or ESI on a cloud service device 112. The target endpoint device 111 and the cloud service device 112 may each be referred to as a "target device" (i.e. the device is a target of digital forensic investigation by the system). A target endpoint device 111 may be a laptop computer, mobile phone, desktop computer, or the like. Examples of cloud services include, Office 365, G Suite, Dropbox Business, Azure, or the like. The target ESI represents information that has been collected from or stored on a target device of a target.

In some embodiments cloud server 120 may be a plurality of cloud servers which together implement the cloud-based evidence processing service.

The forensic service provider device 130 may be a device associated with any entity which provides forensic investigations for a client and may include multiple entities within a forensic partner network. The multiple entities may be located anywhere and may engage with clients worldwide. The forensic service provider device 130 may be an endpoint device such as a laptop computer or desktop computer. The forensic service provider device 130 may be multiple endpoint devices. The forensic service provider device 130 may also include servers.

The client device 140 may be associated with and operated by any entity (client) that requires a legal forensic investigation for the purposes of acquiring evidence from within the target ESI.

The target ESI may exist on the target endpoint device 111 which may be connected to a client network. In some embodiments, a plurality of devices may be connected to the client network including client device 130 and target endpoint device 111. In other embodiments, the client device 130 or the target endpoint device 111 may not be connected to the client network. For example, the target may be an employee with an employer-provided (client provided) laptop which is connected to the employer network. The employee may store ESI on the laptop (target endpoint device) and/or in a cloud service.

The target ESI may exist in the cloud service 112 used by the client. For example, the client may be an employer at a company whose employees store ESI on a cloud service used by the entire company or a subset of the company.

In some embodiments, target ESI may be on multiple target endpoint devices or cloud services, or on a combination of target endpoint devices and cloud services.

In some embodiments, the evidence may be required for early case assessment to determine next steps, for example litigation or further investigation. In other embodiments, the evidence may be acquired as part of a larger investigation. In yet other embodiments, the evidence may be acquired to determine how an incident, e.g. downloading malware, occurred and to provide guidance for dealing with the incident or preventing further incidents.

Examples of use cases may include: an employer who wishes to conduct a review of an employee (target) during outboarding; a corporation wanting to know who within their network opened a phishing email or brought in a virus/malware; and a corporation wanting to know who committed fraud. An investigation may provide context to a situation including what documents and data a person was creating on the target device, what the person was searching for online using the target device, and what they were chatting to others about on any or all methods of communication using the target device.

Therefore, forensic artifacts may include any file, data element, metadata or the like. For example, forensic artifacts may include any documents (e.g. QuickBooks™ documents for a fraud case), pictures, videos, any or all data from methods of communication, search histories from browsers, etc.

Briefly, an investigation may occur as follows.

The client device 140 communicates to the forensic service provider device 130 a request for a cloud-based forensic investigation of a particular or multiple particular devices or networks. That is, the client who may suspect an incident of interest has occurred by an individual (target) or individuals (e.g. IP theft, fraud, etc.) or that an incident of interest has occurred on the client network without a known origin (e.g. malware of unknown origin is on the network).

In some embodiments, the client may log-in to a website or software program on client device 140 and select criteria for scanning electronically-stored information 110 for forensic artifacts (files, data, metadata, etc.) which are relevant to the investigation. The client may choose specific file types, data types, file locations, and/or data locations which match the investigation they wish to have performed. For example, client device 140 may display on a user interface of the client device 140 client-side software having a pre-set list of methods of communication, e.g. e-mail, Slack, Microsoft Teams, etc, from which the client chooses. Additionally, the software may allow the client to choose keywords to search for within all data and locations or certain types of data and locations. However, the client 140 is not required to have knowledge regarding which file/data types or file/data locations may be of interest. The website/software or an investigator from the forensic service provider can guide the client in their investigation based on the type of investigation required. An "investigator" from the forensic service provider is a human who works for the forensic service provider.

In other embodiments, the search criteria may be selected by a user on the forensic service provider device 130. The device providing the search criteria to the cloud server 120 (i.e. the client device or the forensic provider device, as the case may be) may be referred to as an investigation requestor device.

The search criteria is targeted to find and collect only the forensic artifacts that are needed for the investigation, which may reduce time and required storage capacity.

In other embodiments, the client device 140 may communicate with the forensic service provider device 130 by means other than a website or software.

The client device 140 may send the search criteria directly to the cloud server 120 or may send the search criteria through forensic service provider device 130 to cloud server 120.

The client 140 may be required to provide information which enables access to the electronically-stored information 110 of interest. This information may include identifying information for the target device.

Where the electronically-stored information 110 is a target endpoint device 111, the client 140 may provide credentials for accessing the target endpoint device (e.g. network login credentials, user login credentials). The forensic service provider 130 may access the target endpoint device 111 when it is on the client network or off the client network.

Where the electronically-stored information 110 is stored on a cloud service 112, the client 140 may provide credentials for accessing the cloud service (e.g. administrator access).

Generally, the cloud server 120 includes an evidence collection module that is configurable using the received search criteria. The evidence collection module may be a deployable agent (executable) or a collection service. Such evidence collection modules are further described herein. The configured evidence collection module is used to collect forensic artifacts from the target device according to the search criteria.

For a target endpoint device 111, the search criteria, once determined, may be embedded in a deployable agent. The deployable agent is in the form of an executable program. The deployable agent is deployed to the target endpoint device 111. Once deployed to the target endpoint device 111, the deployable agent scans the target endpoint device 111 for the forensic artifacts based on the search criteria chosen at the client device 140 (or at the forensic service provider device 130). The data is collected by the deployable agent and sent to the cloud server 120, where the data is stored. The deployable agent may be configured to automatically establish a connection to the cloud server and transmit collected data from the target endpoint device 111 to the cloud server.

The deployable agent may be configured to automatically delete from the target endpoint device 111 once scanning and data transfer to the cloud server 120 is complete.

In some embodiments, the deployable agent may be configured to live on the target endpoint device for either a predefined period of time or until manually deleted or removed from the target endpoint device via user interaction. By living on the target endpoint device 111, the deployable agent may be used for additional scans and data collection associated with the same or different investigation (provided the search criteria is usable for a different investigation). For example, the deployable agent may be configured to automatically perform regularly scheduled scans and data collection and transfer to facilitate regularly scheduled assessments of the target endpoint device. In another example, the deployable agent living on the target endpoint device 111 may be manually redeployed by a user at regular intervals for the same or similar purpose.

As described, the agent is configured using the search criteria. This configuration of the agent may include the embedding of instructions in the agent based on the search criteria that the agent then uses to perform a search of the target device (e.g. instructions and parameters of the search). The agent then performs the search of the target device, including the collection of data, according to the configuration.

The agent may be configured with the search criteria on the cloud server and deployed to the target device (i.e. pre-configured). The agent may be configured with the search criteria on the target device. In cases where the agent is configurable on the target device, the agent may be deployed from the cloud server to the target device as a base agent (i.e. unconfigured) or may be deployed from the cloud server to the target device as a configured agent (i.e. pre-configured) with the ability to be reconfigured on the target device according to new search criteria and instructions.

In an embodiment, the agent is deployed from the cloud server to the target device as a base agent and the agent is configured "phone home" to the cloud server to get its search criteria from the cloud server.

In another embodiment, the agent can receive multiple sets of search criteria and be configured multiple times according to the multiple sets of search criteria. In some cases, data collected by the agent according to a first search criteria configuration may be used to generate a second search criteria which is then used to configure the agent for a second search. Such reconfiguration of the agent can be performed any number of times. In an example, the agent receives first search criteria from the cloud server (or the agent has the first search criteria embedded, such as by being preconfigured on the cloud server) and performs the search of the target device according to the first search criteria. The agent then receives a second search criteria from the cloud server based on results of the first search. The second search criteria is used by the agent to perform a second, more targeted search. Accordingly, the generation of the search criteria and configuration of the agent can be informed by the results of a prior search performed by the agent.

The agent may be configured to perform two-way agent communication and instruction. The two-way agent communication includes the ability to transmit and receive information (e.g. between the target device and the cloud server). Transmitted information may include search results or other data collected by the agent in performing a search. Such transmitted data can be received by the cloud server and used in a subsequent determination, such as whether to perform another search or to generate a new search criteria with which to configure the agent. Received information may include data, such as search criteria and/or instructions, which when received by the agent instruct the agent on how to perform the search (e.g. search parameters, what information to transmit to the cloud server, etc.) Using two-way agent communication and instruction, the agent can live on the target device (e.g. endpoint) for an extended period of time and continue to receive instructions (such as new or updated search criteria and instructions for performing a search according to the search criteria) and execute the instructions.

Similarly, the cloud server may be configured to perform two-way communication with the deployed agent. This may include transmitting search criteria or instructions and receiving search results and other data from a search performed by the agent. In such cases, the cloud server may be configured to receive search results data from the agent on the target device and determine from the search results data whether a further search should be performed and generate new search criteria for the further search.

For a cloud service 112, the search criteria may be used to configure a collection service to scan the cloud service 112 for the forensic artifacts and collect the data (according to the search criteria) to be stored in at least one cloud server of the cloud-based evidence-processing service 120. The collection service collects cloud-based evidence from a cloud service. The cloud service may be used by an individual or organization (i.e. a plurality of users) to store data such as document and media files (i.e. cloud-based evidence). The collection service may utilize administrator level credentials to access the cloud service. For example, a company may have company-wide access to a cloud service that is used by a collection of users (e.g. employees and others) to store data such as document files or media files. The collection service may use administrator level access to access a particular user's or users' stored contents in the cloud service. The collection service may connect to the cloud service using an application programming interface ("API") and credentials.

Collection of the forensic artifacts from either the target endpoint device 111 or the cloud service 112 (or both) may occur in real-time as the electronically-stored information 110 is being scanned.

A single investigation may include collecting data from both a target endpoint device and a cloud service, as well as collecting from multiple target endpoint devices, and multiple cloud services.

Once the forensic artifacts are stored on the cloud server 120, the cloud-based evidence-processing service analyses the forensic artifacts using a forensic artifact analyzer module.

The forensic artifact analyzer module of the cloud-based evidence-processing service of cloud server 120 may be an automatic process which occurs without the supervision of the forensic service provider using the forensic service provider device 130.

The forensic artifact analyzer module includes a reporting module configured to generate a digital report based on the output of the analysis performed by the forensic artifact analyzer module. The report 121 may be sent to the forensic service provider device 130. The report 121 is configured to be displayable in a user interface of the forensic service provider device 130. The displayed report 121 can be reviewed an investigator. Certain results of the analysis may be flagged by the cloud-based evidence-processing service of cloud server 120 for review. The report 121 may be an html report.

Upon review of the report 121, the forensic service provider may use forensic service provider device 130 to generate a digital report for reporting the findings of the investigation in a manner accessible to the client via client device 140. The report 121 provides the client with information needed to move forward with litigation or further investigation without requiring further tools or analysis. The forensic service provider device 130 transmits the report to the client device 140. The report may be a PDF report or other suitable digital format.

Figure 2:
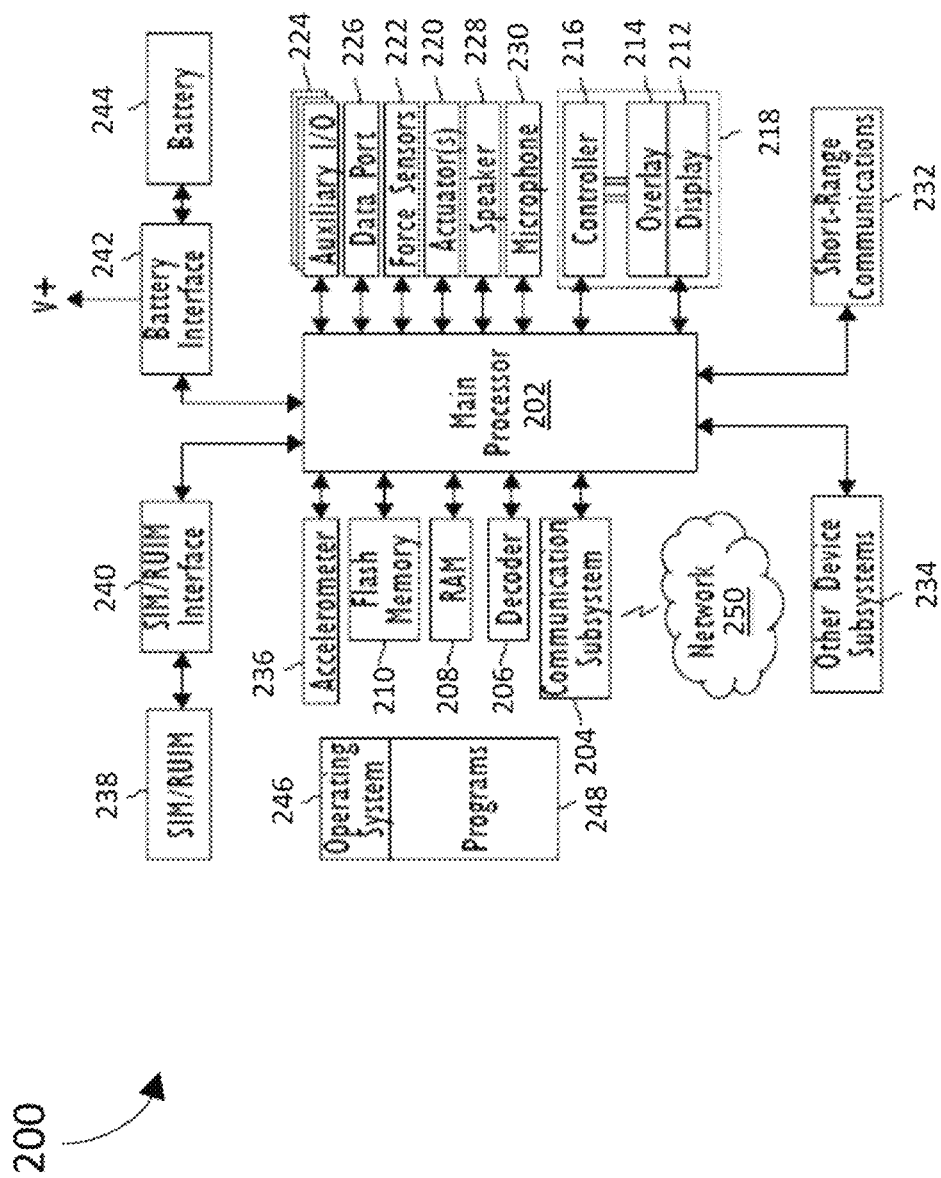
FIG. 2 is a block diagram of a computing device of FIG. 1, according to an embodiment.

FIG. 2 shows a simplified block diagram of components of a device 200, such as a mobile device or portable electronic device. The device 200 may be for example any of devices 130 or 140 of FIG. 1 The device 200 includes multiple components such as a processor 202 that controls the operations of the device 200. Communication functions, including data communications, voice communications, or both may be performed through a communication subsystem 204. Data received by the device 200 may be decompressed and decrypted by a decoder 206. The communication subsystem 204 may receive messages from and send messages to a wireless network 250.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for receiving one or more rechargeable batteries 244.

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the portable electronic device 200 may be similar. The speaker 228 may output audible information converted from electrical signals, and the microphone 230 may convert audible information into electrical signals for processing.

Figure 3:
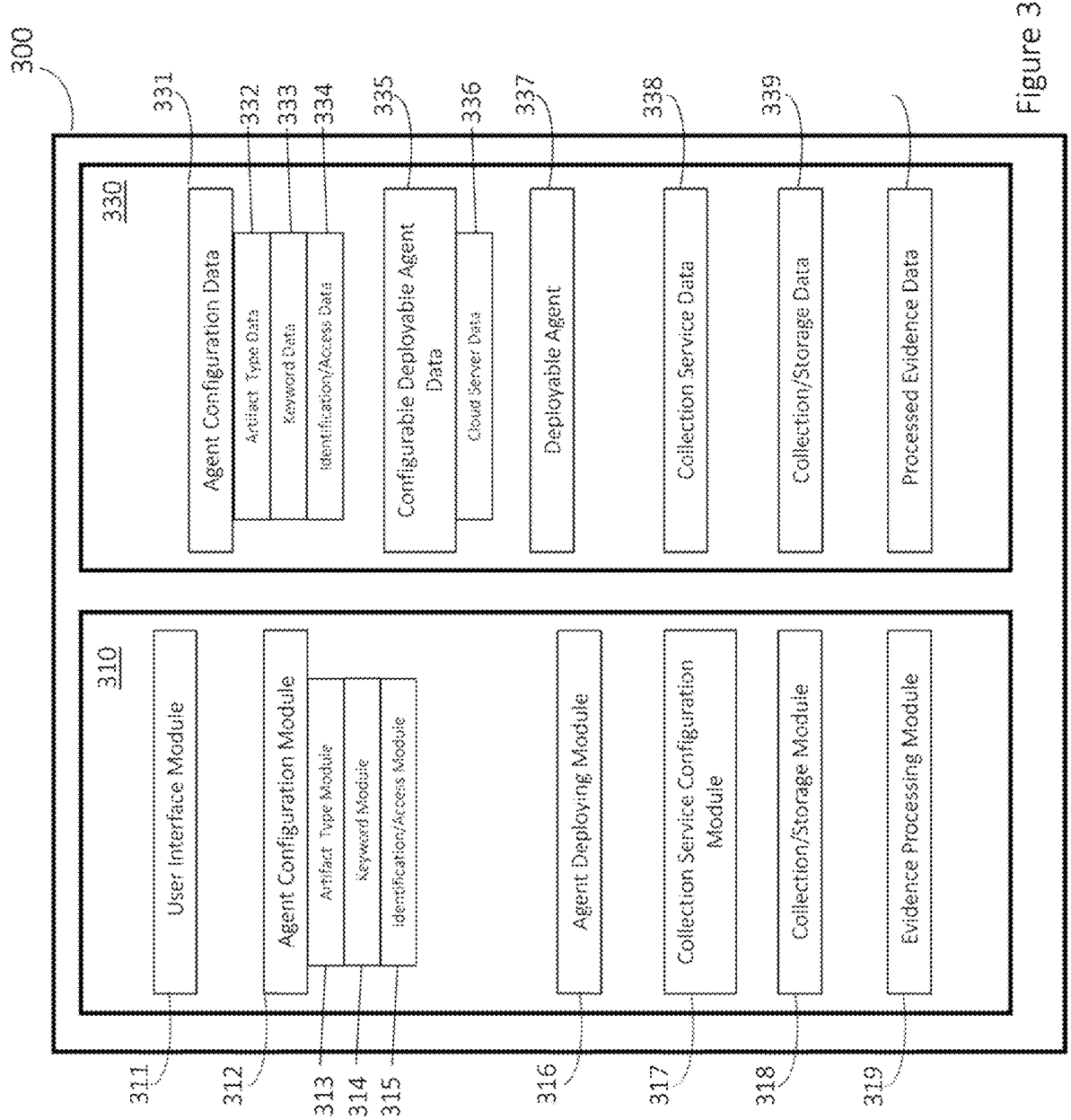
FIG. 3 is a block diagram of a computer system for a cloud-based forensic investigation, according to an embodiment.

Referring now to FIG. 3, shown therein is a computer system 300 for a cloud-based forensic investigation, according to an embodiment. Computer system 300 includes at least one processor 310 and at least one memory 330. Computer system 300 may include multiple devices each having their own processor and memory. For example, computer system 300 may include a client device of a client who is requesting a forensic investigation, a forensic service provider device of a forensic service provider who is providing or supplementing the forensic investigation, and a cloud server of the forensic service provider which enables the forensic investigation to be cloud-based.

Processor 310 includes a user interface module 311, an agent configuration module 312, an agent deploying module 316, a collection service configuration module 317, a collection/storage module 318, and an evidence processing module 319. The agent configuration module 312 may include an artifact type submodule 313, a keyword submodule 314, and an identification/access submodule 315.

Memory 330 includes agent configuration data 331, configurable deployable agent data 335, deployable agent 337, collection service data 338, storage data 339, and processed evidence data 340. Agent configuration data 331 may include artifact type data 332, keyword data 333, and identification/access data 334. Configurable deployable agent data may include cloud server data 336.

A person of skill in the art will appreciate that the modules and data represent steps taken to complete a method of forensic investigation and that the location of the processor or memory may be on any of multiple devices associated with a client or forensic provider. Any reference to a module being on a specific device or multiple modules being on the same device or different devices is used as an example only and in other embodiments specific modules or data may exist on various other devices. Any reference to a single processor or single memory is also only an example as multiple processors and memories are used.

The user interface module 311 provides an interface which allows the user to interact with the software which enables initiation of the forensic investigation. Therefore, in some embodiments the user interface module may be on a client device, wherein the client is the person or group of people initiating an investigation. For example, the client may be an IT lead at a corporation who wishes to investigate an employee's device (target device). In that situation the IT lead may access initiate the investigation through a user interface (of a website or software) on the client device. The user interface module 311 may also be on a forensic service provider device wherein an investigator (e.g. a person who works for the forensic service provider) initiates the investigation through a user interface on the forensic service provider device after receiving a request from the client. Therefore the user interface module may be stored on a processor of the client device or the forensic service provider device or both. There may be multiple user interface modules.

In embodiments where the ESI of interest is on a target endpoint device, the agent configuration module 312 allows the client device or forensic service provider device to configure a deployable agent which is deployed to a target endpoint device. The client or forensic service provider accesses the agent configuration module 312 through a user interface on the client device or forensic service provider device and inputs search criteria identifying forensic artifacts which are to be scanned for and collected from the target endpoint device (e.g. using the deployable agent).

Artifact type module 313 is used to select specific artifact types (e.g. file types, data types) to be collected from the target endpoint device.

Keyword module 314 is used to select specific keywords to search for within ESI, wherein files or data which include the keyword(s) are then collected from the target endpoint device.

Identification/access module 315 is used to provide information regarding the specific identity of the target endpoint device and any credentials needed to access the target endpoint device.

The data input into the agent configuration module 312 is stored in memory 330 as agent configuration data 331, which may include any one or more of artifact type data 332, keyword data 333, and identification/access data 334.

The agent configuration module 312 accesses configurable deployable agent data 335 from memory 330 to create a deployable agent using the agent configuration data 331 (e.g. the artifact type data 332, the keyword data 333, and the identification/access data 334).

The configurable deployable agent data 335 may include cloud server data 336 which determines where the forensic artifacts collected using the deployable agent are stored. The forensic artifacts may be collected to a single cloud server or multiple cloud servers. The cloud server data 336 may be the same for each configurable deployable agent or may be configured in agent configuration module 312.

The configurable deployable agent data 335 may include a base agent. The base agent may be stored in the cloud (e.g. at cloud server 120). The base agent may be considered an agent (executable) pre-configuration (i.e. that has yet to receive configuration instructions). The base agent is configured using the agent configuration data 331 to generate a deployable agent (e.g. executable).

The agent configuration module 312 configures the deployable agent using the agent configuration data 331 and the configurable deployable agent data 335 and stores the deployable agent 337 in memory 330.

Agent deploying module 316 deploys the deployable agent 337 as an executable program to the target endpoint device. At the target endpoint device the deployable agent 337 searches the target endpoint device for forensic artifacts matching the search criteria and sends the forensic artifacts to the cloud server identified by the cloud server data 336 (or other cloud server otherwise identified).

In embodiments where the ESI of interest is on a target cloud service, the collection service configuration module 317 allows the client device or forensic service provider device to configure a deployable agent which is deployed to the target cloud service. The client or forensic service provider accesses the collection service configuration module 317 through a user interface on the client device or forensic service provider device and chooses search criteria for the forensic artifacts to be scanned for and collected from the target cloud service. As with the agent configuration module 312, the collection service configuration module 317 may include an artifact type module, a keyword module, and an identification/access module which perform the same functions as artifact type module 313, keyword module 314, and identification/access module 317. That is, the collection service configuration module 317 allows the client or forensic service provider to select specific artifact types and keywords which a collection service will use to find forensic artifacts on the target cloud service. The identification/access module allows the client or forensic service provider to provide details which allow the collection service to identify and access the target cloud service.

The information received by the collection service configuration module is stored in memory 330 as collection service data 338. Collection service data 338 may also include cloud server data similar to cloud server data 336 which determines where the forensic artifacts will be collected to. The forensic artifacts may be collected to a single cloud server or multiple cloud servers. The cloud server data 336 may always be the same or may need to be configured for each investigation.

Alternatively, computer system 300 may include a collection/storage module 318 separate from the agent configuration module 312 or the collection service configuration module 317 which enables the forensic artifacts to be collected to the (at least one) cloud server. The collection/storage module 318 may provide a user interface on the client device or the forensic service provider device which enables the client of forensic service provider to input instruction for the collection and storage of the forensic artifacts. The input instructions may be stored in memory 330 as collection/storage data 339.

The computer system 300 may include the evidence processing module 319 which provides the functionality and a user interface at the client device or forensic service provider device to enable the client or forensic service provider to choose how the forensic artifacts are processed by the cloud service where evidence processing occurs. While in most embodiments the processed evidence data, such as reports, is stored in the cloud, in some embodiments, some of the processed evidence from the cloud service may be stored in memory 330 as processed evidence data 340, wherein memory 330 exists on the client device, the forensic service provider device, or both.

Figure 4:
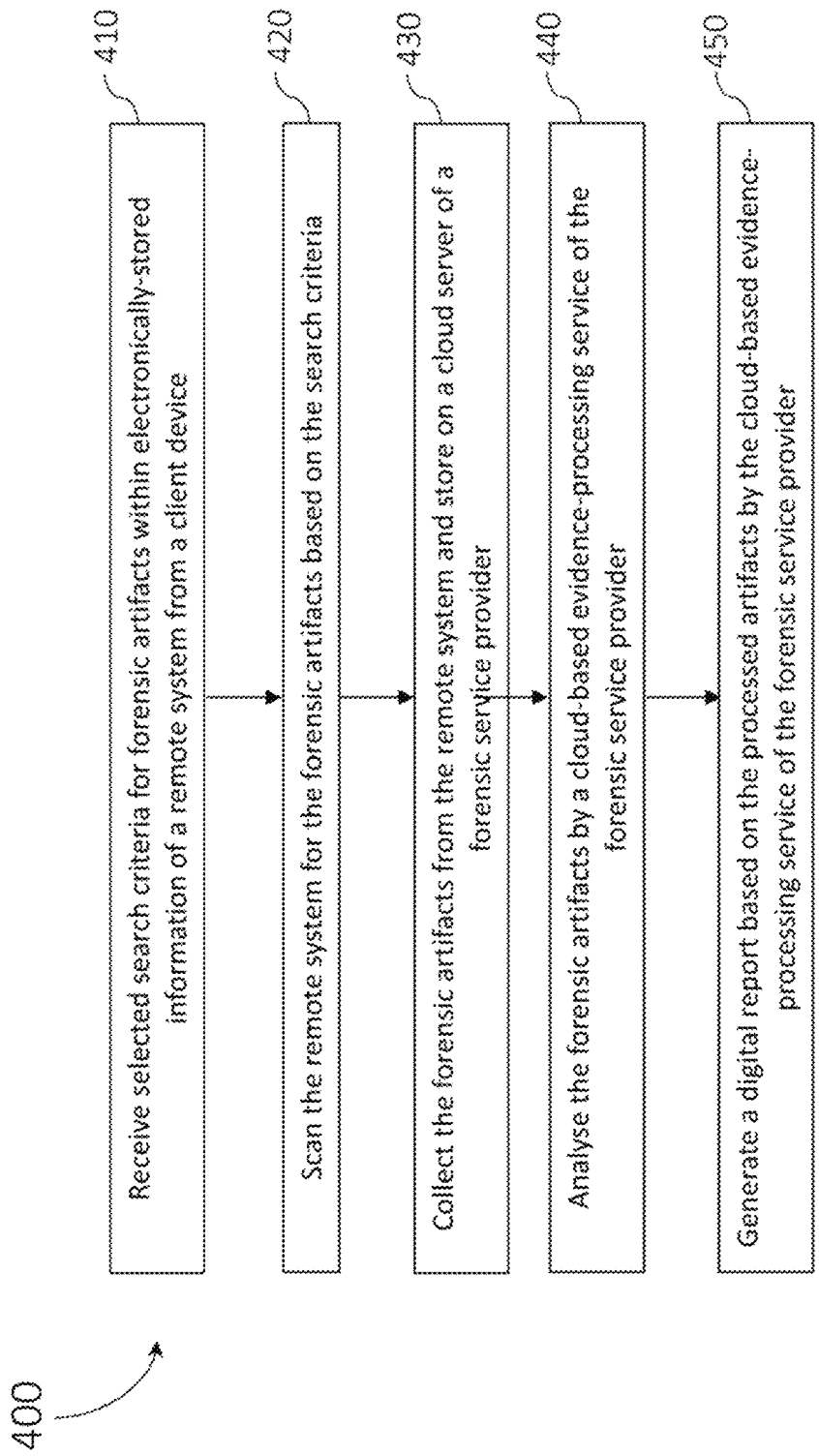
FIG. 4 is a flow diagram of a general method of conducting a cloud-based forensic investigation of electronically-stored information.

Referring now to FIG. 4, illustrated therein is a flow diagram of a general method 400 of conducting a cloud-based forensic investigation of electronically-stored information, according to an embodiment. The system used for method 400 may be similar to system 100 of FIG. 1. The method 400 may be implemented in any suitable hardware, software, firmware, or combination thereof. In the case of software and firmware, the process represents a set of operations implemented as computer-executable instructions stored in memory and executable by one or more processors.

The forensic investigation of method 400 is performed for a target remote system which contains electronically-stored information. The electronically-stored information may be stored on a target endpoint device such as a laptop computer or smartphone or on a target cloud server as part of a cloud service, e.g. Office 365 or Dropbox Business. A person of skill in the art will appreciate that although remote system is referred to in the singular a single investigation may search for information on multiples remote systems.

The cloud-based forensic investigation of method 400 includes a forensic service provider providing a cloud-based evidence-processing service for a client device requesting the investigation.

At 410, the client, using a client device (e.g. laptop computer), selects search criteria for forensic artifacts (of interest) that may be included within electronically-stored information of the remote system. That is, the client device selects certain file/data types, file/data locations, metadata types, keywords or other criteria which are relevant to the specific investigation to set the criteria for which forensic artifacts from the electronically-stored information of the remote system should be acquired and processed during the forensic investigation. In some embodiments, the client selects this criteria in order to perform an early case assessment to determine the next steps as part of pre-litigation or determination of value of a full investigation. In some embodiments, the client may be performing the investigation as part of ongoing litigation or as part of a full investigation.

The client may directly select the criteria using a client device which can access a website or software which enables them to choose the criteria. In other embodiments, the client may work together with the forensic service provider to decide which criteria are relevant for a given investigation. The forensic service provider may provide pre-set criteria for the client to choose from. This pre-set criteria may be shown to the client on a user interface of a website or software on the client device.

In variations, the search criteria may be selected using the client device or the forensic provider device (e.g. via a user interface presented at the selecting device). In such cases, the selecting device may provide the search criteria to the cloud server after receiving the search criteria from the respective user.

At 420, the remote system is scanned to find forensic artifacts which fulfill the search criteria. That is, a connection is established with the remote system (target endpoint device or target cloud server of a cloud service) and the electronically-stored information of the remote system is searched for any and all data, files, metadata, etc. which match any or all of the criteria selected by the client device.

At 430, the forensic artifacts are collected from the remote system and stored on at least one cloud server of the forensic service provider. The forensic artifacts are sent directly from the remote system to the cloud server. The forensic artifacts may be collected in real-time as the remote system is scanned.

At 440, the forensic artifacts are analyzed by a cloud-based evidence-processing service of the forensic service provider. The cloud-based evidence-processing service may be implemented on the same cloud server(s) where the forensic artifacts are stored or may be implemented on a separate server(s). In some embodiments, the cloud-based evidence-processing service may automatically analyze the forensic artifacts once they are collected without any input from the forensic service provider. In other embodiments, the cloud-based evidence-processing service may analyze the forensic artifacts after a receiving a command from the forensic service provider device.

The cloud-based evidence-processing service may generate a report of the findings of the analysis of the forensic artifacts and send the report to the forensic service provider for review.

At 450, a report is generated by the cloud-based evidence processing service and sent to the forensic service provider. The report may be an html report. The report may have specific forensic artifacts which have been flagged according to criteria established by the client of forensic service provider.

Figure 5:
FIG. 5 is a flow diagram of a method of conducting a cloud-based forensic investigation of electronically-stored information from a target device.

Referring now to FIG. 5, illustrated therein is a flow diagram of a method of conducting a cloud-based forensic investigation of electronically-stored information from a target endpoint device, according to an embodiment.

Method 500 is performed for a target endpoint device such as a laptop computer or smartphone. A person of skill in the art will appreciate that although target endpoint device is referred to in the singular a single investigation may include searching for information on multiple endpoint devices. The method 500 may be implemented in any suitable hardware, software, firmware, or combination thereof. In the case of software and firmware, the process represents a set of operations implemented as computer-executable instructions stored in memory and executable by one or more processors.

The cloud-based forensic investigation of method 500 includes a forensic service provider providing a cloud-based evidence-processing service for a client device requesting the investigation.

At 505, a client logs in to a website of the forensic service provider using the client device. The client may use log in credentials to access a website which enables the client to request an investigation and tailor the investigation for a specific purpose. The client does this using the user interface provided by the client device.

The client may create an account at the time of requesting an initial investigation or may have previously created an account.

In other embodiments, the client may access software that they have downloaded (or otherwise obtained) to request an investigation and may not access a website.

At 511, on the website or software, the client, using the client device, selects search criteria for forensic artifacts (of interest) that may be included within electronically-stored information of the endpoint device. That is, the client device selects certain file/data types, file/data locations, metadata types, keywords or other criteria which are relevant to the specific investigation to set the criteria for which forensic artifacts from the endpoint device should be acquired and processed during the forensic investigation. In some embodiments, the client selects this criteria in order to perform an early case assessment to determine the next steps as part of pre-litigation or determination of value of a full investigation. In some embodiments, the client may be performing the investigation as part of ongoing litigation or as part of a full investigation.

In other embodiments, the client may work together with the forensic service provider to decide which criteria are relevant for a given investigation. The forensic service provider may provide pre-set criteria for the client to choose from. This pre-set criteria may be shown to the client on a user interface of the client device as a website or software.

At 515, device access data for the target endpoint device is provided to the forensic service provider by the client using the client device. The client provides access information which may include log in details for the target endpoint device, administrator access details, network details, and any other details required so that the forensic service provider has access to all of the relevant electronically-stored information of the endpoint device.

At 516, the search criteria is embedded in a deployable agent. The deployable agent is an executable program that can be sent to and downloaded at the endpoint device to perform a search of the electronically-stored information of the end point device. The access information may also be embedded in the deployable agent. The deployable agent may generated by configuring a base agent using the received search criteria. In this way, the base agent is configured to the specific search and retrieval. The base agent is stored in the cloud server. The search criteria is received at and stored in the cloud server. The deployable agent is configured in the cloud server (using the search criteria). The deployable agent, once configured, may be stored in the cloud.

At 517, the deployable agent is remotely deployed to the endpoint device. The access information may be required to deploy the agent. The deployable agent is deployed from the cloud (e.g. from cloud device 120).

In variations, the deployable agent may be accessed and deployed on a physical storage medium (e.g. USB stick) that is connected or inputted to the endpoint device and installed, remotely deployed to the endpoint device from the cloud using deployment tools, deployed to the endpoint device by generating and providing a web link which can be accessed on the endpoint device and from which the agent can be downloaded and executed, or may be deployed by sending an email including the deployable agent which when opened on the endpoint device can allow the agent to be downloaded to the endpoint device and executed.

At 521, the deployable agent scans the target endpoint system to find forensic artifacts which fulfill the search criteria. The executable program executes and the electronically-stored information of the endpoint device is searched for any and all data, files, metadata, etc. which match any of the criteria selected by the client device.

At 531, the forensic artifacts are collected from the target endpoint system and stored on a cloud server of the forensic service provider. The forensic artifacts are sent directly from the target endpoint system to the at least one cloud server. The forensic artifacts may be collected in real-time as the target endpoint device is scanned.

Upon completion of scanning the endpoint device, the deployable agent may be automatically deleted from the endpoint device. In other embodiments, the deployable agent may remain on the endpoint device. In such cases, the deployable agent may be used again. New or revised search criteria may require a new deployable agent.

At 540, the forensic artifacts are analyzed by a cloud-based evidence-processing service of the forensic service provider.

The cloud-based evidence-processing service may be implemented on the same cloud server where the forensic artifacts are stored or may be implemented on a separate server.

In some embodiments, the cloud-based evidence-processing service may automatically analyze the forensic artifacts once they are received without any input from the forensic service provider. In other embodiments, the cloud-based evidence-processing service may analyze the forensic artifacts after receiving a command from the forensic service provider.

At 550, the cloud-based evidence-processing service may generate a report. The report details the findings of the analysis of the forensic artifacts and is sent to the forensic service provider for review. The report may be an html report. The report may include flagging of specific forensic artifacts which are relevant to the investigation.

A further final report may be provided to the client from the forensic service provider which details the findings of the analysis of the forensic artifacts. This report will be accessible to the client, i.e. the client will be provided with all of the information they need to determine the next step of their investigation (e.g. go to litigation, a more complete investigation, no further action) without requiring more tools or further analysis on the part of the client. The final report may be in the form of a PDF.

Figure 6:
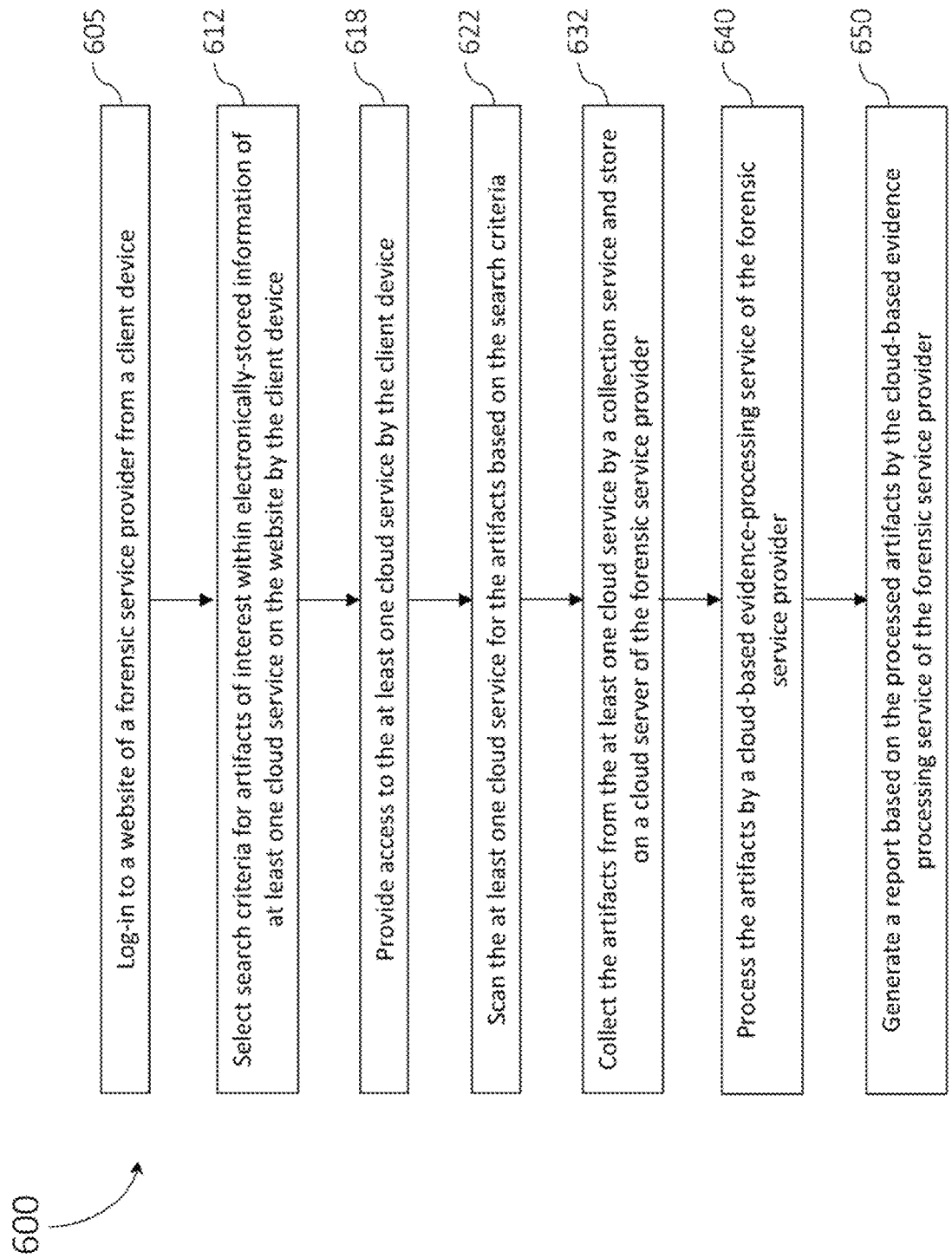
FIG. 6 is a flow diagram of a method of conducting a cloud-based forensic investigation of electronically store information from a cloud service.

Referring now to FIG. 6, illustrated therein is a flow diagram of a method 600 of conducting a cloud-based forensic investigation of electronically-stored information from a target cloud service, according to an embodiment. The target cloud service may be, for example, Office 365, Dropbox Business, or the like. A person of skill in the art will appreciate that although cloud service is referred to in the singular a single investigation may be search for information on multiple cloud services.

The cloud-based forensic investigation of method 600 includes a forensic service provider providing a cloud-based evidence-processing service for a client device requesting the investigation.

At 605, a client logs in to a website of the forensic service provider using the client device.

That is, the client uses log-n credentials to access a website which enables the client to request an investigation and tailor the investigation for a specific purpose. The client does this using the user interface provided by the client device.

The client may create an account at the time of requesting an initial investigation to receive log-in credentials or may have previously created an account and received log-in credentials.

In other embodiments, the client may access software that they have downloaded (or otherwise obtained) to request an investigation and may not access a website.

At 612, on the website or software, the client, using the client device, selects search criteria for forensic artifacts (of interest) that may be included within electronically-stored information of the cloud service. That is, the client device selects certain file/data types, file/data locations, metadata types, keywords or other criteria which are relevant to the specific investigation to set the criteria for which forensic artifacts from the cloud service should be acquired and processed during the forensic investigation. In some embodiments, the client selects this criteria in order to perform an early case assessment to determine the next steps as part of pre-litigation or determination of value of a full investigation. In some embodiments, the client may be performing the investigation as part of ongoing litigation or as part of a full investigation.

In other embodiments, the client, using the client device, may work together with the forensic service provider to decide which criteria are relevant for a given investigation. The forensic service provider may provide pre-set criteria for the client to choose from. This pre-set criteria may be shown to the client on a user interface of the client device as a website or software.

At 618, access to the target cloud service is provided to the forensic service provider by the client using the client device. The client provides access information which may include log in details for the target cloud service, administrator access details, network details, and any other details required so that the forensic service provider has access to all of the relevant electronically-stored information of the cloud service.

At 622, the target cloud service is scanned to find forensic artifacts which fulfill the search criteria. That is, the access information is used to access the cloud service and the electronically-stored information is searched for files, data, and/or metadata which match the search criteria.

At 632, the forensic artifacts are collected from the target cloud service by a collection service and stored on a cloud server of the forensic service provider. The forensic artifacts are sent directly from the cloud service to the cloud server. The forensic artifacts may be collected in real-time as the cloud service is scanned.

At 640, the forensic artifacts are analyzed by a cloud-based evidence-processing service of the forensic service provider. The cloud-based evidence-processing service may be implemented on the same cloud server where the forensic artifacts are stored or may be implemented on a separate server. In some embodiments, the cloud-based evidence-processing service may automatically analyze the forensic artifacts once they are collected without any input from the forensic service provider. In other embodiments, the cloud-based evidence-processing service may analyze the forensic artifacts after receiving a command from the forensic service provider.

At 650, the cloud-based evidence-processing service generates a report of the findings of the analysis of the forensic artifacts and send the report to the forensic service provider for review by the forensic service provider. The report may be an html report. The report may include flagging of specific forensic artifacts which are relevant to the investigation.

A further final a report may be provided to the client from the forensic service provider which details the findings of the analysis of the forensic artifacts. This report will be accessible to the client using the client device, i.e. the client will be provided with all of the information they need to determine the next step of their investigation (e.g. go to litigation, a more complete investigation, no further action) without requiring more tools or further analysis on the part of the client. The report may be in the form of a PDF.

Figure 7A:
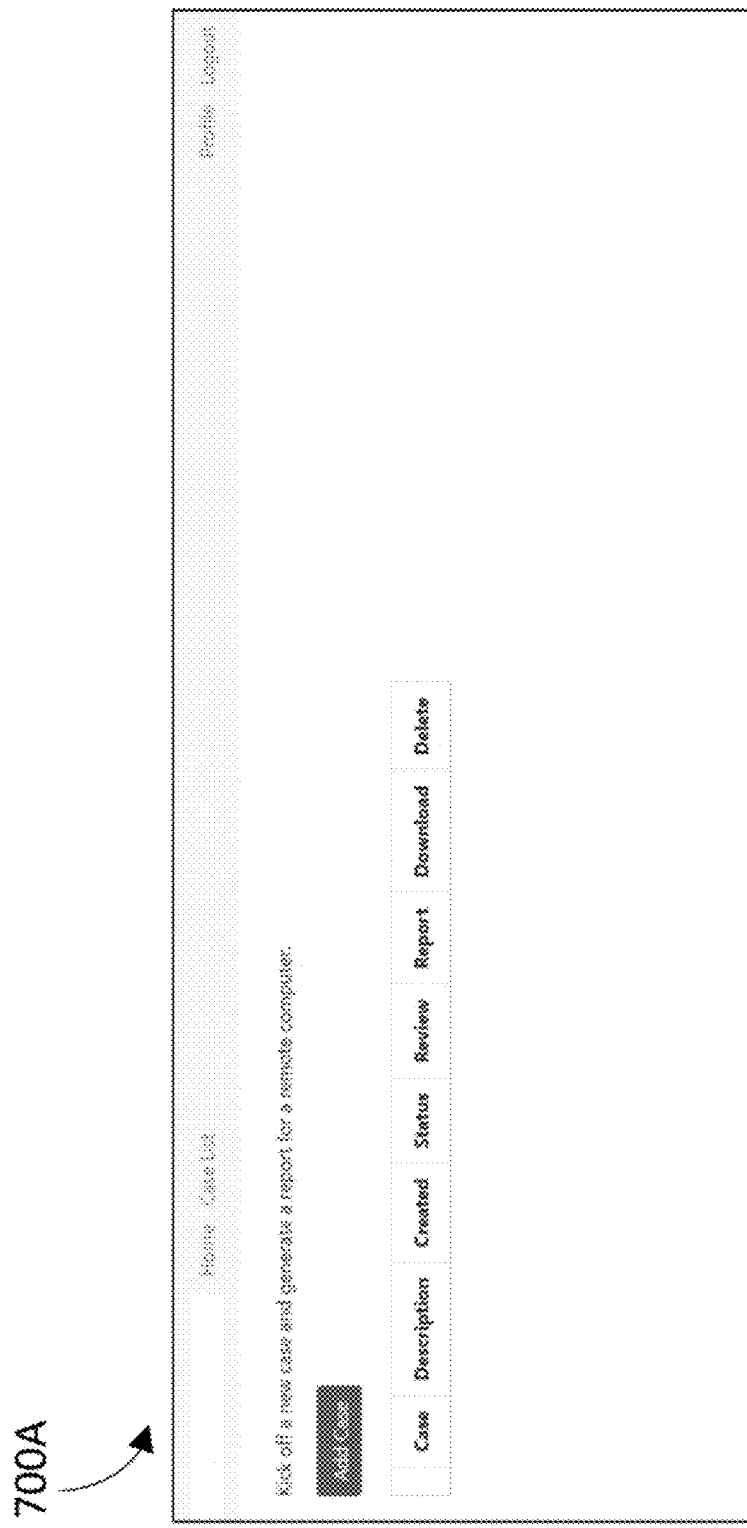
FIG. 7A is a screenshot of an example user interface for initiating a cloud-based forensic investigation of a remote target endpoint system, according to an embodiment.
Figure 7B:
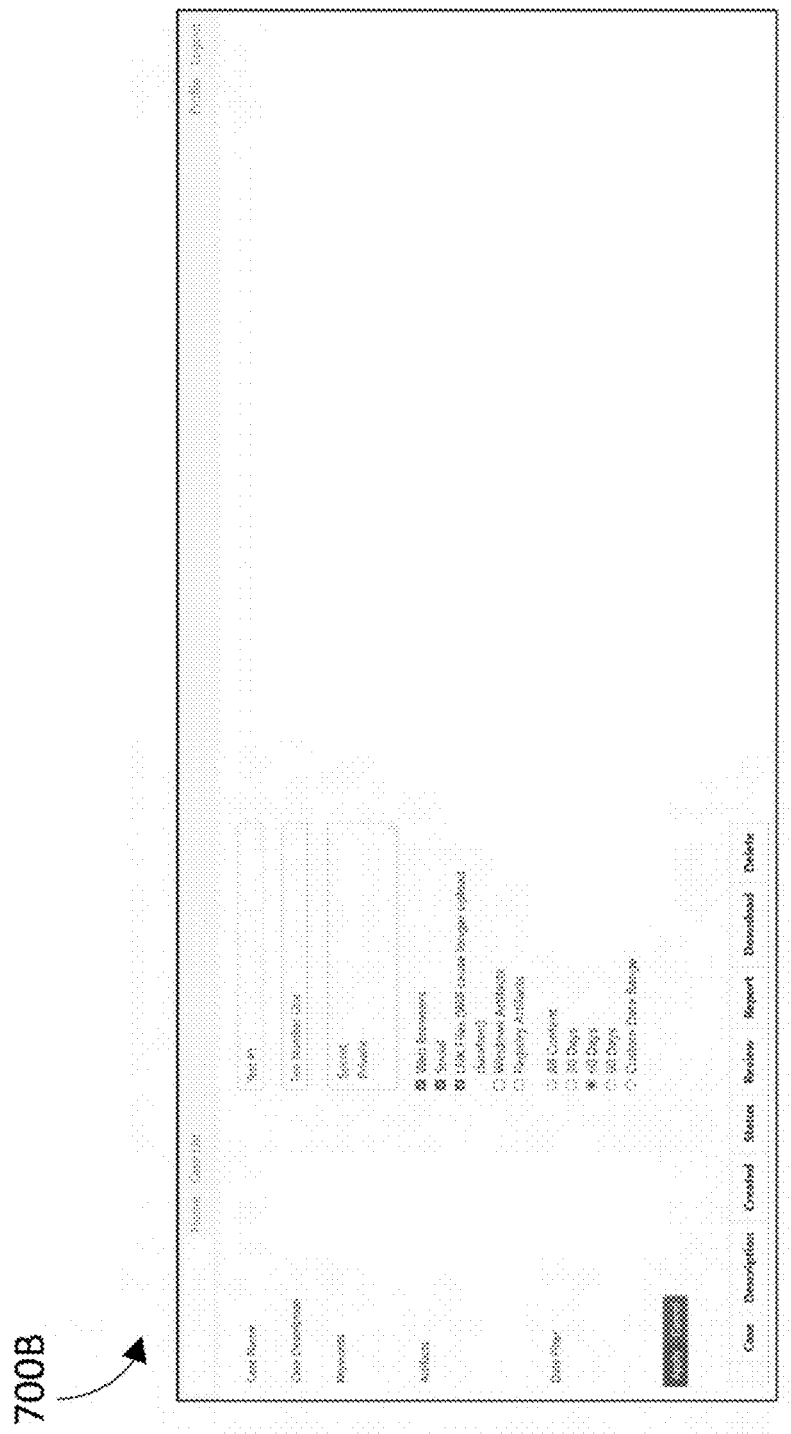
FIG. 7B is a screenshot of an example user interface for initiating a cloud-based forensic investigation of a remote target endpoint system, according to an embodiment.
Figure 7C:
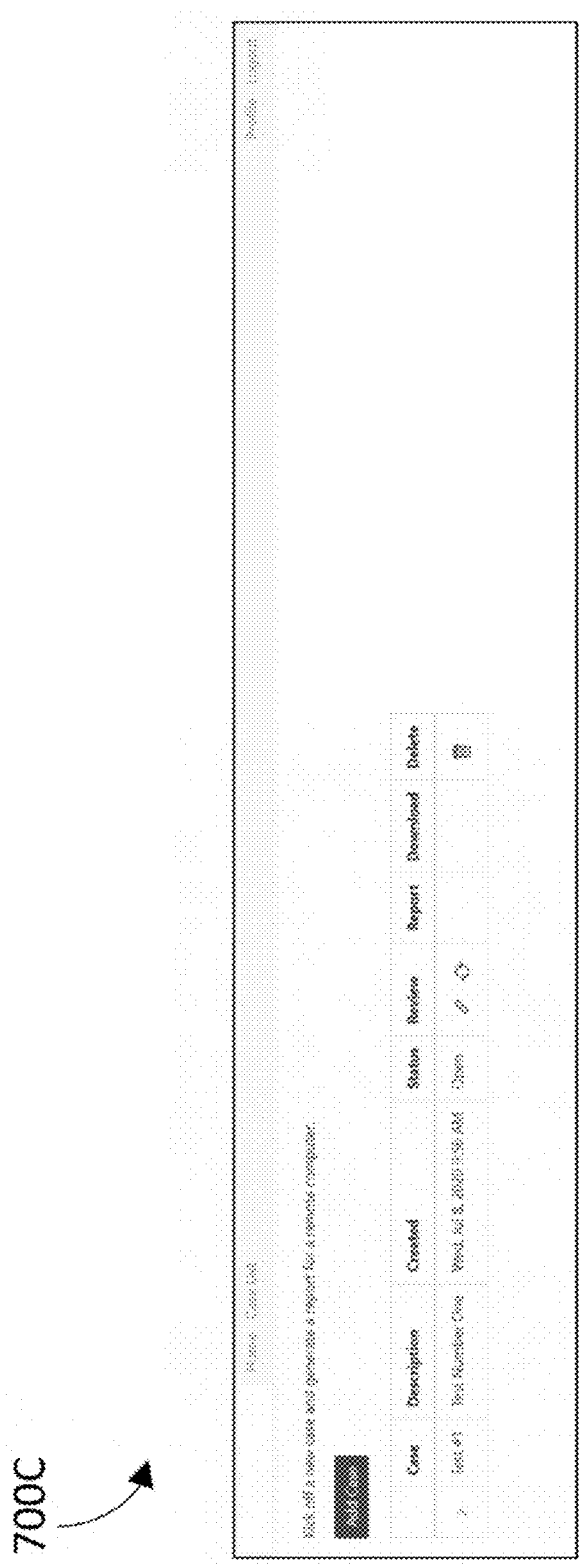
FIG. 7C is a screenshot of an example user interface for initiating a cloud-based forensic investigation of a remote target endpoint system, according to an embodiment.

Referring now to FIGS. 7A, 7B, and 7C, shown therein are example user interfaces 700A, 700B, and 700C for initiating a cloud-based forensic investigation of a remote target endpoint system, according to an embodiment.

User interface 700A shows a "Case List" page of a website (or software) which enables a user, through a user device, to initiate a new forensic investigation or look at past investigations. The user may be any person who wishes to initiate a forensic investigation on a remote system. For example, the user may be an IT Lead in a corporate setting who suspects an outgoing employee has stolen some information. In the embodiment of FIG. 7 the remote system is a target endpoint device. In other embodiments, with different user interfaces, the remote system may be a target cloud service.

The user logs-in to the website using log-in credential to access a profile which is specific to the user. The user may access their profile information by clicking on "Profile", or logout of the system by clicking "Logout". The user may access a list of cases by clicking on "Case List" (FIG. 700A is the case list without any cases present). Clicking on "Home" brings the user to a home page.

User interface 700A shows the heading for the "Case List": "Case", "Description", "Created", "Status", "Review", "Report", "Download", and "Delete".

The user may start a new investigation by clicking "Add Case".

User interface 700B shows a page for creating a deployable agent (an executable program) which can be deployed to a target device to search electronically-stored information on the target device for forensic artifacts relevant to the forensic investigation. The user can input a case name (here "Test #1) and a case description (here "Test Number One"). The user may input keywords that the deployable agent will search for within the electronically-stored information to collect files or data which contain those keywords (here "Secret" and "Private"). The user may choose from a pre-set list of artifacts, herein "Web Browsers", "Social", "LNK Files", "Windows Artifacts", and "Registry Artifacts". In other embodiments the pre-set list may exclude some of these artifact types and include other artifact types. The user may also apply a date filter which specifies a date range from which to collect forensic artifacts. Herein the filters are "All Content", "30 Days", "60 Days", "90 Days", or "Custom Date Range". Custom date range allows the user to specify any date range. The user clicks "Apply" to create a deployable agent once they have input the necessary information.

User interface 700C shows the same page as user interface 700A but now the deployable agent created in FIG. 7B is shown in the case list. The case list shows the name of the case, the description of the case, the date the case was created, and the status of the case ("open"). Under review, the chain link symbol allows the user to access a link to download the deployable agent onto the user device. The symbol of two arrows in a circle enables the user to create a new link for the deployable agent once the first link has already been accessed (the link is only valid for one use). The report column indicates is a report has been created for the investigation. The download column indicates there is an agent available to be downloaded (i.e. that an agent has been generated by the cloud service and can be deployed). The trash can symbol in the download column allows the user to delete the case from the case list.

Figure 8:
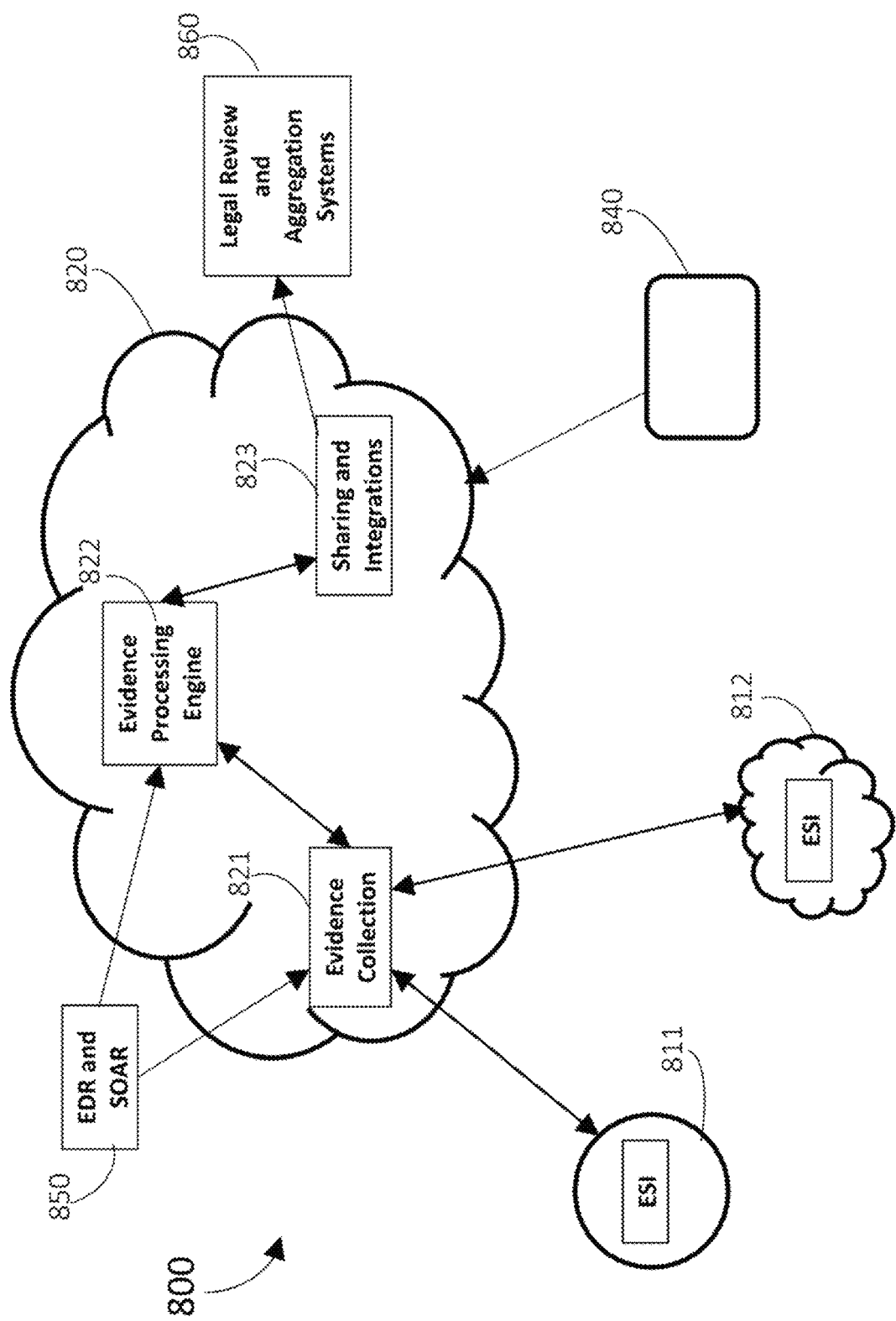
FIG. 8 is a schematic diagram of a system for cloud-based forensic investigations, according to an embodiment.

Referring now to FIG. 8, shown therein is a system 800 for cloud-based forensic investigations, according to an embodiment. System 800 is similar to system 100 of FIG. 1, however, system 800 provides more cloud-based forensic processing functionality than computer system 100 while limiting the processing which occurs directly on forensic provider devices. That is functionality which is carried out by the forensic service provider on a physical device at a set physical location is moved to the cloud.

System 800 includes a cloud service 820 which is hosted on at least one cloud server, a client device 840 initiating a forensic investigation, target endpoint device 811, and target cloud service 812. Target endpoint device 811 and target cloud service 812 include electronically-stored information (ESI) from which evidence is to be collected for the forensic investigation. Communicative connections between aspects of system 800 are shown as arrows, with the direction of the arrows denoting the direction of communications, but communicative connections have not been labelled to reduce clutter.

Cloud service 820 includes four modules: an evidence collection module 821, an evidence processing module 822, and a sharing and integrations module 823.

Cloud service 820 may also receive evidence from endpoint detection and response systems (EDR) and/or security orchestration, automation, and response systems (SOAR) 850. The systems 850 are configured to perform endpoint detection. The systems 850 may include tools to access physical files on a computer. The systems 850 may identify and provide indicators about activity on one or more computers (antivirus, strange internet behaviour). The systems 850 may be configured to flag such activity for follow up and a closer look at the machines on which the activity was detected. In an embodiment, the evidence collection module 821 may be configured to call, via an API or the like, an agent of the system 850 that is configured to identify activity which agent may then feed data (e.g. files) back to the requesting module of the cloud service 820 (e.g. evidence collection module 821). Calling by the cloud service 820 may be initiated upon receiving an alert or the like from the EDR system 850 indicating activity to investigate that has been detected by the EDR system 850. This may allow for initiating a scan in a programmatic way and increase automation of the system 800 and the cloud service 820. For example, feeding of information from the EDR system 850 that indicates suspicious activity (the suspicious nature of which may be determined by the EDR system 850 prior to sending, by the cloud service 820, or both) may automatically trigger the evidence collection module 821 to perform scanning and collection of forensic artifacts from computers identified in the data sent from the EDR system 850 to the cloud service 820. This may include the deployment of an agent to the identified computers. The deployed agent may be automatically configured (for example, using data received from the EDR system 850) or pre-configured.

The client device 840 may be any computing device capable of interacting with cloud service 820 through an internet connection. The client device 840 is used by a client to initiate an investigation. The client uses the client device 840 to access software or a website which enables selection of search criteria to be used in the forensic investigation of the target endpoint device 811 or the target cloud service 812. In some embodiments the investigation may occur for multiple target endpoint devices and/or cloud services.

The client device 840 sends the cloud service 820 a request to initiate a forensic investigation which includes search criteria for forensic artifacts (e.g. files, data, metadata or the like which may be relevant to an investigation) within the ESI of the target endpoint device 811 or target cloud service 812 (or both). The request must include the search criteria as well as information which enables the cloud service 820 to identify and access the target endpoint device 811 or cloud service 812.

Upon receiving a request for initiation of a forensic investigation from the client device 840 the evidence collection module 821 accesses the target endpoint device 811 or target cloud service 812, searches for forensic artifacts which fit the search criteria, and collects the forensic artifacts to a storage on at least one cloud server of the cloud service 820.

When cloud service 820 collects evidence from EDR and SOAR 850, an application programming interface (API) between the evidence collection module 821 and the EDR and SOAR 850 may exist to facilitate the collection. The system 850 may include and utilize and EDR agent or the like for collecting files from a target device. In some cases, the cloud service 820 may leverage the EDR agent rather than deploy an agent from the cloud service 820. Such an approach may be more streamlined. In some cases, the EDR system 850 may provide the cloud service 820 with a pre-processed list of all processes (or a subset thereof) running on a target device. In such a case, the cloud service 820 can receive the pre-processed data and display the pre-processed data (e.g. in a user interface). In other cases, the EDR system 850 may provide and the cloud service 820 receives data that requires further processing by the cloud service 820, such as a system file.

The evidence which is collected and stored by the evidence collection module 821 is then processed by the evidence processing engine. The evidence processing module includes an AI module, an app decoding module, a queuing module, and an evidence review and analysis module. The evidence review and analysis module includes an analytics submodule and an evidence review submodule. The evidence review submodule may provide a way for a user to navigate through and review collected forensic artifacts and digital evidence from the target device. This may include providing bookmarking functionalities, search and filter functionalities, web history, or operating system information. The analytics submodule may be configured to generate a visualization around data using the collected digital evidence. One example of such a visualization is a timeline representation generated using metadata of collected files (e.g. using date or timestamp information of files). The analytics submodule may use artificial intelligence or machine learning techniques to detect certain types of digital evidence. For example, collected digital evidence may be fed to a trained machine learning model configured to analyze text of digital messages (e.g. text messages, emails, chat service etc.) and detect harassment messages.

When cloud service 820 collects evidence from EDR and SOAR 850, an application programming interface (API) between the evidence processing module 822 and the EDR and SOAR 850 may exist to facilitate the processing of the evidence. For example, the system 850 may include an API that is leveraged by the evidence processing module 822 to call the EDR/SOAR system 850 and request certain information (e.g. processing running on a device or devices).

Processed evidence is then sent to the sharing and integrations module 823. Sharing and integrations API. The sharing and integrations module 823 includes a collaboration module and a reporting module. Sharing and interactions module 823 includes an API through which processed evidence, likely in the form of reports, can be sent to legal review and aggregation systems 860. The sharing and integrations module 823 includes one or more components for feeding data generated by the cloud service to an external system such as legal review and aggregation systems 860. This may include generating representations of the cloud service data that are usable by the systems 860 (e.g. pdf, excel files).

While the above description provides examples of one or more apparatus, methods, or systems, it will be appreciated that other apparatus, methods, or systems may be within the scope of the claims as interpreted by one of skill in the art.

The invention claimed is:

1. A system for conducting a cloud-based, forensic investigation to find and collect evidence within electronically-stored information of a target, the system comprising:
   at least one remote system of the target of the cloud-based forensic investigation, wherein the at least one remote system comprises electronically-stored information;
   an investigation requestor computing device, comprising executable instructions stored in at least one memory and at least one processor to execute the instructions, the device configured to request a forensic investigation of the at least one remote system; including:
   selecting search criteria for the investigation, wherein the search criteria specify one or more selectable forensic artifact types to find on and collect from the remote system; and
   configuring an evidence collection module using the search criteria, the evidence collection module operable, once configured, to:
   search the electronically-stored information to find forensic artifacts of the one or more forensic artifact types on the at least one remote system according to the search criteria, wherein the at least one remote system is a target endpoint device, and wherein the evidence collection module is a deployable agent comprising an executable program embedded with the search criteria that is deployed to the target endpoint device to search for the forensic artifacts and the deployable agent automatically deletes from the target endpoint system;
   collect the forensic artifacts from the at least one remote system;
   establish a connection to a cloud server configured to store the forensic artifacts; and
   transmit the forensic artifacts to the cloud server for storage;
   a cloud-based evidence-processing service executed by or in communication with the cloud server and configured to retrieve and analyze the forensic artifacts and generate an initial report.

2. The system of claim 1, wherein the at least one remote system is a cloud service.

3. The system of claim 1, wherein the investigation requestor device logs in to a website to request the forensic investigation and to select the search criteria.

4. The system of claim 1, wherein the cloud-based evidence-processing service automatically analyzes the forensic artifacts upon collection of the forensic artifacts from the remote system.

5. The system of claim 1, wherein the forensic artifacts are flagged by the cloud-based evidence-processing service within the initial report.

6. The system of claim 1, wherein the initial report is generated automatically by the cloud-based evidence-processing service and sent to the forensic service provider.

7. A method of conducting a cloud-based, forensic investigation to find evidence within electronically-stored information of a target, the method comprising:
   receiving at a cloud server search criteria for forensic artifacts within electronically-stored information of at least one remote system of the target of the cloud-based forensic investigation from an investigation requestor device, wherein the search criteria specify one or more selectable forensic artifact types to find and collect from the at least one remote system to acquire evidence for the forensic investigation;
   configuring an evidence collection module using the search criteria, the evidence collection module operable, once configured, to:
   search the electronically-stored information to find forensic artifacts of the one or more forensic artifact types on the at least one remote system according to the search criteria, wherein the at least one remote system is a target endpoint device, and wherein the evidence collection module is a deployable agent comprising an executable program embedded with the search criteria that is deployed to the target endpoint device to search for the forensic artifacts and the deployable agent automatically deletes from the target endpoint system;
   collect the forensic artifacts from the at least one remote system;
   establish a connection to a cloud server configured to store the forensic artifacts; and
   transmit the forensic artifacts to the cloud server for storage;
   processing the forensic artifacts using a cloud-based evidence processing service; and
   generating a digital report based on the processed forensic artifacts.

8. The method of claim 7, wherein the search criteria is selected by the client.

9. The method of claim 8, wherein the client logs into a forensic service provider website to select the search criteria.

10. The method of claim 7, wherein selecting search criteria by a client further includes selecting search criteria from pre-determined options provided by the forensic service provider.

11. The method of claim 7, wherein the remote system is at least one cloud service.

12. The method of claim 11, wherein the client provides access to the at least one cloud service.

13. The method of claim 11, wherein the forensic artifacts are collected from the at least one cloud service by a collection service.

14. The method of claim 7, wherein the initial report is generated automatically.

15. The method of claim 7, wherein at least one artifact of interest is flagged for review.

16. A system for conducting a cloud-based, forensic investigation to find evidence within electronically-stored information of a target, the system comprising:

a target computing device comprising at least one memory for storing electronically-stored information;

a cloud server configured to:

receive search criteria from an investigation requestor device, the investigation requestor device being a client device or a forensic provider device, wherein the search criteria specify one or more forensic artifact types to find on and collect from the remote system to acquire evidence for the forensic investigation;

configure an evidence collection module using the received search criteria, wherein the at least one remote system is a target endpoint device, and wherein the evidence collection module is a deployable agent comprising an executable program embedded with the search criteria that is deployed to the target endpoint device to search for the forensic artifacts and the deployable agent automatically deletes from the target endpoint system;

initiate evidence collection from the target device using the configured evidence collection module;

store a forensic artifact collected by the configured evidence collection module;

analyze the forensic artifact using an evidence processing module; and generate a digital report from an output of the evidence processing module.

* * * * *